March 8, 1927. 1,619,987
K. G. ÖSTBERG
ADVERTISING APPARATUS
Filed Feb. 21, 1923    3 Sheets-Sheet 2
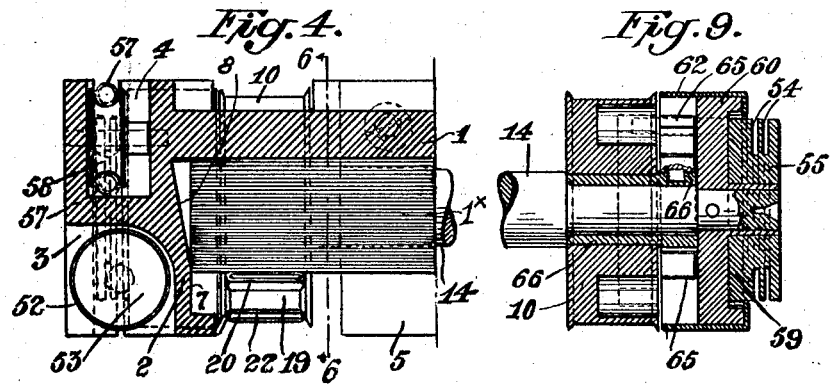
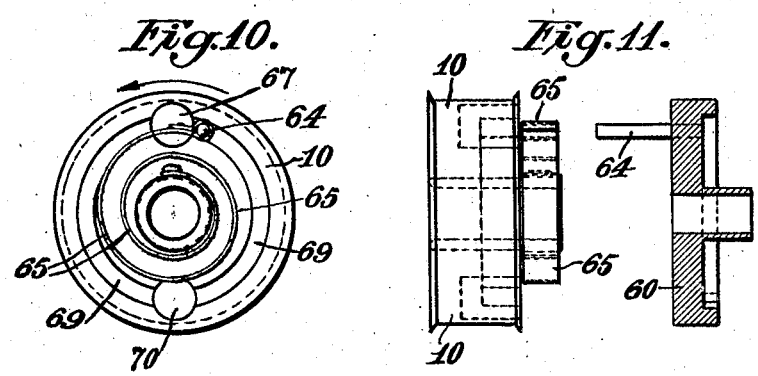
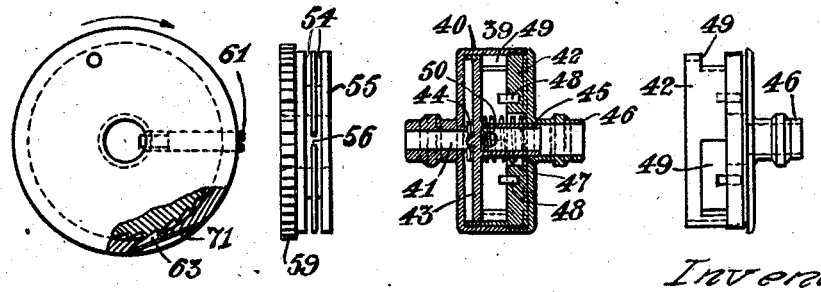
Inventor:
K. G. Östberg

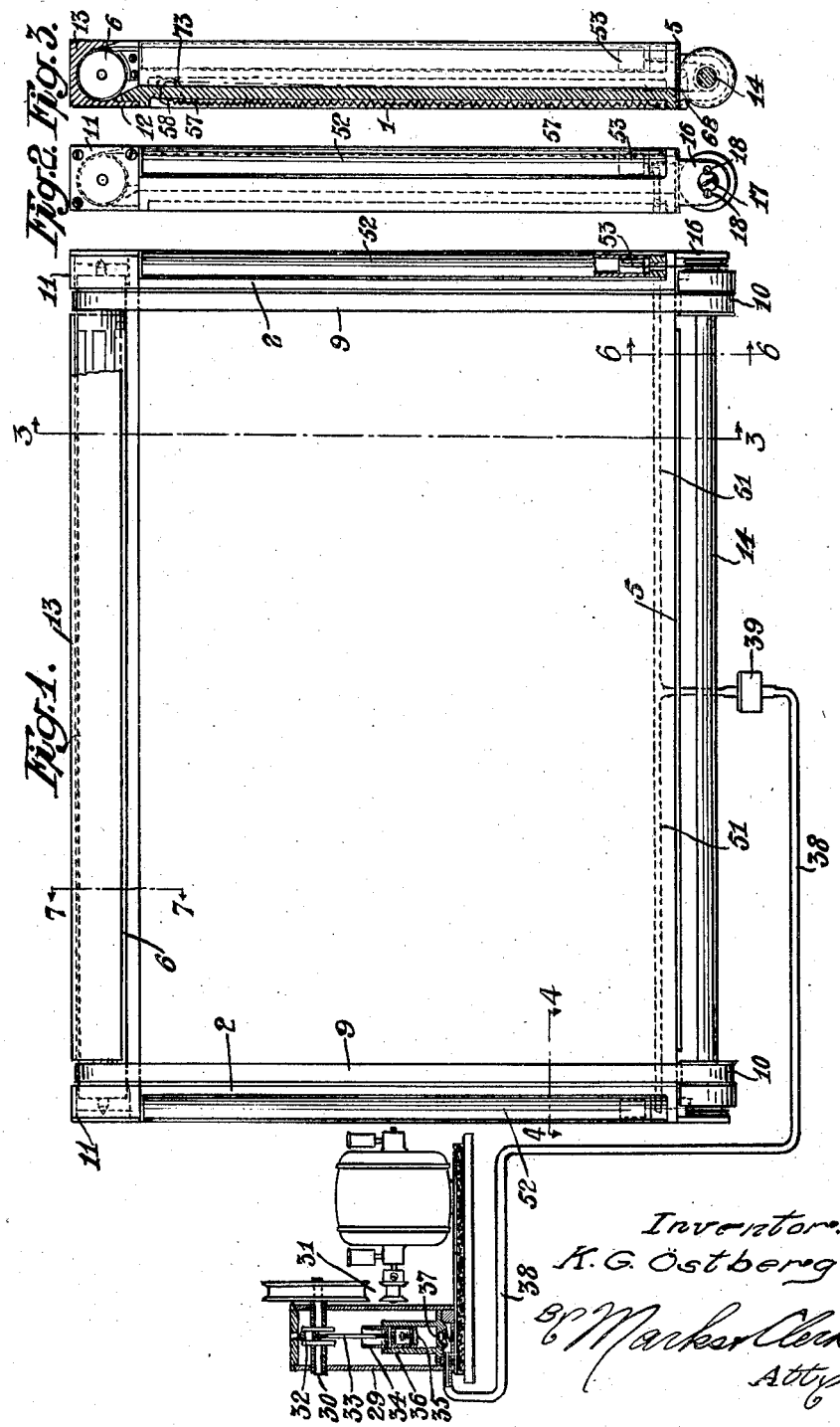

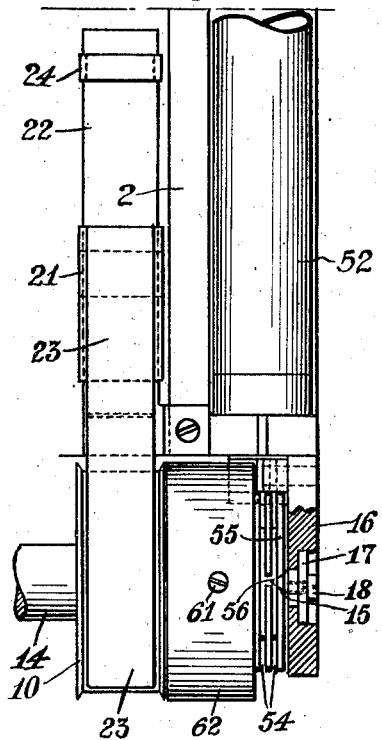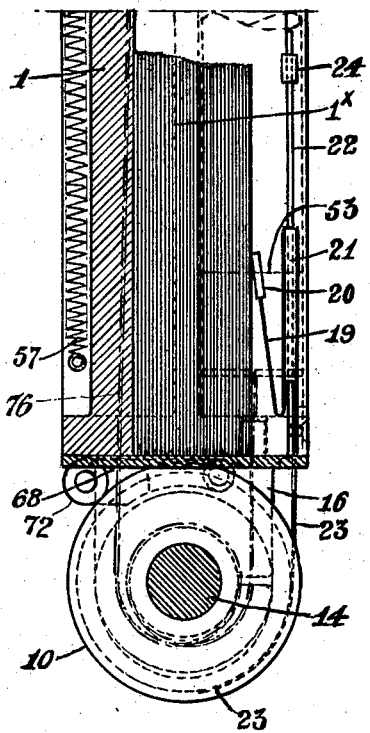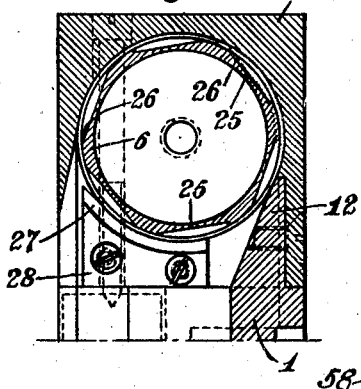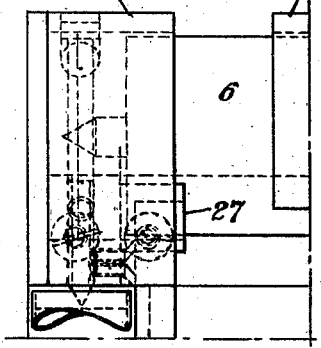

Patented Mar. 8, 1927.

1,619,987

UNITED STATES PATENT OFFICE.

KARL GUSTAF ÖSTBERG, OF STOCKSUND, SWEDEN.

ADVERTISING APPARATUS.

Application filed February 21, 1923, Serial No. 620,491, and in Sweden February 18, 1922.

The invention relates to advertising apparatus of the type having interchangeable advertising leaves arranged to be moved successively and periodically in a cycle to and from an exposing position. The object of the invention is to provide an apparatus of this kind containing a great number of advertisements and having a relatively small size. This is attained according to the invention by concentrating the advertising material as much as possible and constructing the shifting mechanism so as to fit closely to the space occupied by the advertising material and to allow the advertising leaves to move close to said space while being shifted. By constructing the apparatus in the manner hereinafter described it is in fact possible to produce an advertising apparatus of the said type in the form of a board, which, though having a thickness of only about 3 cm., may hold about two hundred advertising leaves, the whole of the front of the board except for only a narrow frame being utilized as effective exposing surface. The board may also be so constructed as to make it possible to use both sides for exposing the advertisements.

Another object of the invention is to provide an operating mechanism, which is well suited for the present purpose.

An advertising apparatus having the above mentioned characteristic features may for instance be placed in a show-window without encroaching essentially upon the space reserved for the goods. Further, such an apparatus is particularly suitable as an advertising apparatus for tram cars, etc.

The advertising leaves are preferably made of a thin and flexible material, for instance paper, in the form of rectangular sheets, which are provided on both sides with text or pictures and arranged in a suitable container so as to form a packet or block, one or, if required, both sides of which are visibly arranged. This arrangement of the advertising material, which is known per se, allows of the different advertising leaves to be easily removed from the apparatus and replaced by other similar leaves.

In connection with this arrangement of the advertising material the periodical shifting of the leaves is effected according to this invention within a very limited space by using a friction shifting mechanism, whereby the outer leaf on one side, for instance the front side, of the packet is moved to the opposite side of the packet while being turned round one edge of the packet. By this operation the advertisement on the outer side of said leaf is moved out of an exposing position or into such a position or both, according to the direction of movement and according as the packet is adapted to be exposed on one or both sides. In the case last mentioned each leaf will, evidently, be exposed successively on both sides of the packet. In moving one leaf from one side of the packet to the other the leaves of the packet are pushed somewhat forward owing to the pressure of the leaf that is being shifted, against the rear wall of the container. After having been shifted the leaf will therefore be advanced step-wise within the container towards the exposing position. Thus, each leaf will be moved in a cycle involving a slow intermittent movement within the container perpendicularly to the surface of the leaf and a quick shifting movement round the edge of the packet. The said movement of the leaves within the container may also be effected wholly or partly by the bottom of the container being inclined forwards and downwards.

The invention will be more closely described with reference to the accompanying drawings, which show a preferred embodiment of the invention, in which the packet is adapted to be exposed only on one side.

Fig. 1 shows a front view of the apparatus together with a converter unit adapted to convert electrical energy into compressed air energy the latter being used for operating the apparatus. Fig. 2 shows a side view and Fig. 3 a section on the line 3—3 in Fig. 1. Fig. 4 is a section on the line 4—4 in Fig. 1. Figs. 5 to 16 are details drawn on a larger scale. Fig. 5 is a front view of the lower right-hand corner of the apparatus on a larger scale. Fig. 6 is a section on the line 6—6 in Figs. 1 and 4. Fig. 7 is a section on the line 7—7 in Fig. 1. Fig. 8 is a front view of the upper left-hand corner. Fig. 9 is a section of the lower part of Fig. 5. Figs. 10, 11, 12 and 13 show the parts of Fig. 9 separated from one another. Fig. 14 is a section of the control valve 39 shown in Fig. 1. Fig. 15 is a side view of one part of the control valve. Fig. 16 is a detail of the arrangement shown in Fig. 3.

In order to make the figures more clear the packet of advertising leaves is supposed to be removed from the apparatus except in Figures 4 and 6, in which the packet is partly shown and designated by I×. The packet is enclosed in a container, which is partly made of cast-metal, and which serves at the same time as a frame for the shifting mechanism. The rear wall of the container consists of a plate 1, Figs. 1, 3, etc., provided with ribs 2 at its vertical edges. Said ribs, the left-hand one of which is shown in section in Fig. 4, form the side walls of the container and are provided each with two grooves 3, 4 adapted to receive the driving devices. The bottom of the container consists of a plate 5, Figs. 1, 3, 4, screwed to the plate 1. The front side of the container is preferably covered by a glass plate, not shown in the drawings. At its upper end the container is closed up by the shifting roller 6 of the shifting mechanism. When the advertising material is placed in the container, the latter is substantially filled out by the packet of leaves. The packet then rests on the plate 5, while the rear side of the packet is pressed against the wall 1. The front side of the packet is visible through the above mentioned glass plate and this side therefore represents the exposing position. The width of the advertising leaves is somewhat smaller than the inner width of the container between the outer parallel parts 7 of the side walls, Fig. 4. The inner width of the container is increasing rearwards from said parallel parts, as seen from Fig. 4. Each leaf that is being pushed down between the packet and the wall 1 will therefore move freely without wearing against the side walls of the container. In moving slowly forwards within the container the leaves are guided by the forwardly converging parts 8, Fig. 4, of the side walls, the leaves being thus adjusted while moving forwards so as to be finally properly positioned between the parallel surfaces of the part 7 of the side walls.

The shifting mechanism consists, apart from the driving devices, of two parts. One part is an auxiliary or feeding mechanism by means of which the leaf to be shifted is displaced so far in the direction of movement as to be brought into engagement with the proper shifting mechanism.

The proper shifting mechanism chiefly consists of a rotatable roller 6 mounted horizontally above the container, and two endless belts 9 each running over one end of the roller and over a belt pulley 10 arranged beneath the container vertically below the corresponding end of the roller. The roller 6 is pivoted with centre journals 74 in two bearing bodies 11, Figs. 1, 2 and 8, secured by means of screws 75 to a flange 12, Figs. 3 and 7, of the plate 1. The roller 6 is partly surrounded by a protecting sleeve 13, which serves at the same time as a guide in turning the leaves round the roller. Said sleeve is screwed to the flange 12. The belt pulleys 10 are rotatably mounted on a horizontal shaft 14, Figs. 1, 3, 4, 5, 6, 9, pivoted on centre journals 15, which are adjustable for the purpose of regulating the tension of the belts, as will appear from Fig. 5. The adjusting device is attached to an extension 16 of the frame. The centre journal 15 projects through a bore hole in the said extension 16 and is arranged eccentrically on a disk 17, which is normally secured in place by two set-screws 18, Fig. 2. After the screws have been loosened, the disk may be turned round its axis, a circular movement being thereby imparted to the journal owing to its eccentric position, whereby the tension of the belt is increased or decreased. The belt pulleys 10 are so arranged that the belts 9 will run at a small distance from the front and rear sides of the packet near the vertical edges thereof.

The auxiliary mechanism for moving the leaves into engagement with the shifting mechanism consists of two spring systems which are normally in frictional engagement with the foremost leaf and in engagement with the belts. These spring systems are arranged in the lower corners of the apparatus between the belts and the packet. Figs. 5 and 6 show the spring system of the right-hand corner the belt being removed to show the mechanism. The spring consists of a V-shaped soft plate spring 19 carrying at one end a rubber sleeve 20 which is kept in place by notches in the edges of the spring and arranged to bear against the foremost leaf of the packet indicated in Fig. 6. The other end of the spring 19 is soldered to a thin sleeve 21 slidable on a guide in the form of a bar or upright 22 screwed to the lower end of the rib 2. Soldered to the sleeve 21 is the upper end of a thin, flexible plate spring 23, the lower end of which is interposed between the belt and the pulley 10.

The belt pulleys 10 are arranged to be rotated periodically by the shifting mechanism hereinafter to be described, so as to carry out quickly a few revolutions for each shifting operation, the movement of the pulleys being transmitted to the shifting roller 6 by the belts 9 which are then running upwards on the front side of the packet. The plate springs 23 are then lifted until their lower ends are disengaged from the belts. In order to prevent the springs from being moved too far owing to their inertia, there is provided a rubber stop sleeve 24 at the upper end of each bar 22. By the action of the friction sleeves 20 bearing against the front side of the packet the outermost leaf is moved so far upwards as to cause its upper edge to be seized by the shifting mechanism.

The V-shaped form of the springs 19 has proved in practice to be very suitable for obtaining a strong frictional engagement with the leaf even at a small pressure. Owing to this fact the risk of another leaf being carried along with the leaf to be shifted owing to the friction between adjacent leaves is practically eliminated. The feeding device is also capable of an automatic adjustment in such a manner that the strength of the frictional engagement will increase with the resistance opposing the movement of the leaf. This is attained by the springs 19 being directed upwards at a small angle against the packet so as to be bent outwards when operating. This bending of the springs will evidently increase the angle of the outer end of the spring against the packet, whereby the rubber sleeves 20 are pressed faster against the paper. The pressure of the springs will thus increase automatically in case of the resistance against the movement of the leaf being increased. This construction of the feeding device has also the advantage that the leaf after having been seized will not be hampered in its movement by the rubber sleeves 20, as the springs 19 will then be straightened out so as to allow the leaf to pass freely.

The seizing of the leaf by the shifting mechanism is effected by the leaf being jammed between the belts and the roller 6. The leaf will thus be carried along by the belts and turned round the roller without sliding thereon. During this movement the fore edge of the leaf is guided by the inner surface of the protecting sleeve 13. When being shifted, the leaf is further guided towards the rear side of the packet by the inner surface of the flange 12, Fig. 7, by which the fore edge of the leaf is carried against the rear side of the packet at an acute angle and thereby forced between the packet and the rear wall 1 of the container. Another object of the guiding surface of the flange 12 is to effect a bending of the leaf in a direction opposite to the bending of the leaf on the shifting roller 6. By the bending of the leaves round the said roller the leaves would obtain a remaining curvature which, unless smoothed out by a bending in the opposite direction, would cause a pressure on the foremost leaf of the packet which by the joint action of the other leaves might be large enough to prevent the displacement of the foremost leaf.

During the continued movement of the leaf behind the packet the latter is advanced within the container to an extent corresponding to the thickness of one leaf. The latter part of the shifting movement of the leaf, after its having been disengaged from the belts, is effected by the influence of the inertia of the leaf. This power is generally sufficient to drive the leaf down to the bottom 5 of the container, however, in order to be sure that the leaf will not stop in a position in which it would bar the way for the next leaf, the shifting roller is provided with a number of (in this case 6) longitudinal recesses or grooves 25, Fig. 7, extending over part of the length of the roller and forming longitudinal shoulders or abutments 26. In case a leaf, upon being shifted, would be stopped immediately after its having been disengaged from the belts, its rear edge would be seized by a following shoulder and carried further down so as to be moved out of the path of the next leaf. The downward movement of the leaf is finally completed by the frictional engagement with the next leaf. The grooves 25 do not extend, as above mentioned, over the whole length of the shifting roller, the cylindrical surface of the roller being left smooth at the ends of the roller and, if required, also at the middle thereof. This will have the effect that a leaf which has been stopped too early will come into engagement with a groove of the roller by the spring action of the leaf only along a part of its rear edge, and the leaf will therefore be easily disengaged from the groove after having been carried down as far as possible and, further, the edge will be more stiff so as not to be bent forward beneath the roller, whereby the edge might be injured.

The number of revolutions imparted to the shifting roller for each shifting operation is not larger than required for a complete movement of a leaf from the front to the rear of the packet. After this forward movement has ceased, a small rotary movement in the opposite direction is imparted to the belt pulleys 10 by means of a device hereinafter to be described, whereby the plate springs 23 are again brought into engagement with the belts and thus returned by the belts. In this way the auxiliary or feeding mechanism is returned to the normal position shown in the drawings and prepared for the next shifting operation.

In some cases, for instance if the leaves have rough surfaces so as to adhere more strongly to one another, it may be necessary to provide a special device for preventing more than one leaf to be brought into engagement with the shifting mechanism at a time. Figs. 7 and 8 show a device of this kind, viz, the left-hand part thereof, a similar part being provided at the right-hand end of the shifting roller. Said device is located beneath the end of the roller and consists of a plate 27 curved concentrically with the roller and provided with a flange 28 screwed to the corresponding bearing body 11 of the roller so as to leave only a narrow gap between the fore edge of the plate and the inner surface of the bearing body the width of said gap being only slightly larger than the thickness of each leaf. Said gap will, consequently, only allow the outermost leaf at the front side of the packet to pass therethrough for each shifting operation, whereas other leaves, in case they are carried along by the friction, will be stopped against the plate 27.

Having now particularly described the shifting mechanism of the apparatus a driving device suitable for use in connecting with said shifting mechanism will be described. As mentioned above, the operation of the apparatus requires that a movement is imparted to the belts for each shifting operation, which is composed of a forward movement and a following smaller return movement. The latter movement is not produced directly by the driving device but by a particular spring system adapted to store up part of the kinetic energy of the shifting roller at the end of the forward movement and to give back said energy for the return movement.

The apparatus in this case is driven by means of compressed air produced by means of the converter unit shown in Fig. 1. The air pump is enclosed in a casing 29, in which a crank shaft 30 is mounted. This shaft is being driven continuously by means of a small electric motor and a belt transmission 31 and arranged to operate the piston 34 of the air pump by means of a crank 32 and a connecting rod 33. The piston contains a spring actuated valve 35 opening downward upon the piston being raised, and the pump cylinder 36 contains a spring actuated valve 37 opening downward upon the piston being forced down. The air is stored up in a hose 38 serving at the same time to connect the converter unit with the advertising apparatus, or the air may be stored up in a separate air-chamber. The supply of air to the hose 38 will go on, until the pressure of the air is sufficient to operate a control valve 39 inserted in the hose conduit, the control valve being then opened so as to allow the air to enter the apparatus. Compressed air will pass only for a very short period of time through the control valve, which is immediately after closed so as to cause another quantity of air to be stored up for the next shifting operation. The time required for storing up a quantity of air sufficient for each shifting operation is dependent partly on the volume of the air container or conduit and partly on the pressure of the spring acting upon the control valve. By providing suitable means for regulating one or both of said conditions the operating period of the control valve may be conveniently regulated.

The construction of the control valve appears from Figs. 14 and 15. The valve is enclosed in a casing composed of two parts screwed together. The front part 40 of the casing contains the air inlet connected with the hose 38 and the inner mouth of which serves as a valve seat 41. The rear part 42 of the casing contains the outlet, which is connected by the corresponding part of the hose 38 with the advertising apparatus. The valve consists of a disk 43 fitting into a cylindrical sleeve of the rear part of the casing. Said disk is provided at one side with a tightening rubber ring 44 bearing against the valve seat, while at the opposite side said disk 43 is provided with a tubular extension 45 fitting slidably in the outlet tube 46 and serving to guide the valve. The valve is normally pressed against the valve seat by means of a helical spring 47. After the air pressure in the hose 38 has reached a value sufficient to overcome the spring pressure on the valve, the air enters the front chamber of the valve casing. The air will then act on the whole surface of the valve disk 43, which is thereby flung against the stop pins 48. The air will now pass round the edge of the disk 43 through openings 49 in the cylindrical sleeve of the rear part of the valve casing into the rear valve-chamber, from which it escapes through a hole 50 in the tube 45 to the advertising apparatus. Owing to the fact that the air pressure acts upon a considerably larger surface of the valve, when the valve is open, than when the valve is closed, the valve will be maintained open until the air pressure has been reduced to a fraction of the critical opening pressure. The air then enters through the branch tube 51, Fig. 1, into two vertical air cylinders 52, Figs. 1, 2, 4, disposed each in one of the grooves 3 in the frame and containing a piston 53 which by the action of the compressed air will be pushed up to the upper end of the air cylinder.

Figs. 5 and 9 to 13 inclusive show in detail the transmission devices at the right-hand side of the apparatus for transmitting the movement of the piston to the corresponding pulley. Similar devices are arranged at the other side of the apparatus symmetrically with respect to those at the right-hand side. Fastened to the lower end of the piston is a thin wire 76, which is partly wound on a rope pulley 55 mounted on the shaft 14, Figs. 5, 9, 13. The wire is disposed in two grooves 54 of the pulley and passed through a notch 56 in the flange separating the two grooves. The other end of the wire is connected with the upper end of a long helical spring indicated in Fig. 3 and shown in section in Fig. 4. Said spring 57 is disposed in the groove 4 of the frame and passed over a roller 58 mounted in the frame, said roller and part of said spring being shown separately on Fig. 16. The other end of the spring is fastened in the lower part of the groove 4, Fig. 6.

When the piston is quickly moved upwards, the rope pulley 55 is rotated thereby causing the part of the wire connected with the piston to be wound off from the inner groove, whereas the other part is wound on into the outer groove. The helical spring 57 is then stretched over the roller 58. The rope pulley is arranged to transmit the movement to the belt pulley 10 by means of a ratchet wheel 59, Figs. 9, 13, and a driving wheel 60, Figs. 9, 11. The ratchet wheel is rigidly connected with the rope pulley. The driving wheel is arranged concentrically with the ratchet wheel and secured to the shaft 14 by means of a screw 61 and, further, provided with a protecting sleeve 62. The engagement of the ratchet wheel with the driving wheel is effected by means of a wedge 63, Fig. 12, operating as a detent and loosely arranged in a recess in the edge of the driving wheel. Said wedge is kept in place by means of a plate spring 71 disposed in the said recess between the edge of the driving wheel and the protecting sleeve and operating to press the wedge 63 against the teeth of the ratchet wheel. The driving wheel carries a pin 64 passed through a loop formed by the outer end of a clock spring 65, Figs. 9, 10, 11, the inner end of which is fastened to a bushing 66 of the pulley 10. This spring has normally a tension sufficient to keep the pin 64 pressed against a rubber stud 67, Fig. 10, on the belt pulley. It is easily understood from the above description, how the forward movement of the rope pulley is transmitted to the belt pulley. The ratchet wheel will engage the wedge 63 on the driving wheel, and the latter will transmit the movement to the belt pulley by the pressure of the pin 64 against the stud 67. When the piston reaches the upper end of the air cylinder, the driving wheel 60 is suddenly stopped by a shoulder 73, see Figs. 3 and 16, on the wire 76 engaging a brake arm 68, Figs. 3, 6, arranged above the protecting sleeve and pivoted at 72. Said arm will then be firmly pressed by the pressure of the air on the piston 53 against the protecting sleeve. The belt pulley 10, on the other hand, as well as the belts and the shifting roller will continue their forward movement owing to the inertia of the moving parts, the spring 65, which evidently counteracts the movement, then taking up part of the kinetical energy of the mechanism. During this continued movement of the belt the pin 64 passes freely in a groove 69, Fig. 10, on the pulley, until a second rubber stud 70 on the pulley strikes the pin, whereby the forward movement of the shifting mechanism is stopped. Owing to the tension of the spring 65 the shifting mechanism is now returned, the movement being now again limited by the stud 67 striking the pin 64. By the said return movement the auxiliary mechanism is restored to its normal position in the manner above described. After the air pressure in the cylinders has been reduced owing to the air leaking away, the spring 57 will finally return the rope pulley 55 and the piston 53 to their normal positions. During this movement the teeth of the ratchet wheel will pass freely over the wedge 63.

When the advertising apparatus is arranged to expose the advertising leaves on both sides of the packet, the shifting movement should take place horizontally instead of vertically as in the case above described. If the apparatus described would be adapted to expose the leaves on both sides, the apparatus would have to be turned so that the shifting roller would stand upright and the wall 1 of the container would have to be replaced by a glass plate or the like.

What I claim is:

1. An advertising apparatus comprising in combination a packet of advertising leaves, a rotatable friction shifting roller disposed along one end of the packet and adapted to shift the leaves from one side of the packet to the other, means for guiding the leaves round the edge of the packet while moving over the roller, a number of endless belts adapted to run round the packet over said roller, and means for feeding the leaves successively into frictional engagement between the roller and the belts.

2. An advertising apparatus as claimed in claim 1, in which the shifting roller is thicker than the packet and so arranged as to allow the leaves to be passed on to the rear side of the packet at an acute angle to the packet.

3. An advertising apparatus comprising in combination a packet of advertising leaves, a rotatable friction shifting roller disposed along one edge of the packet and adapted to shift the leaves from one side of the packet to the other, a number of endless belts adapted to run round the packet over said roller, and means for feeding the leaves successively into frictional engagement between the roller and the belts.

4. An advertising apparatus comprising in combination a packet of advertising leaves, a rotatable friction shifting roller disposed along one edge of the packet and adapted to shift the leaves from one side of the packet to the other, two endless belts adapted to run round the packet over said roller and arranged one at each end of the roller, and a friction feeding mechanism operating against one side of the packet to advance the leaves successively into frictional engagement between the roller and the belts.

5. An advertising apparatus comprising in combination a packet of advertising leaves, a rotatable friction shifting roller disposed along one edge of the packet and adapted to shift the leaves from one side of the packet to the other, a number of intermittently operated endless belts adapted to run round the packet over said rollers, and means operated by the belts for feeding the leaves successively into frictional engagement between the roller and the belts.

6. An advertising apparatus comprising in combination a packet of advertising leaves, a rotatable friction shifting roller disposed along one edge of the packet and adapted to shift the leaves from one side of the packet to the other, a number of intermittently operated endless belts adapted to run round the packet over said roller, and a friction feeding mechanism comprising a number of friction feeding members arranged to be actuated one by each belt and to operate against one side of the packet so as to advance the leaves successively into frictional engagement between the roller and the belts.

7. An advertising apparatus as claimed in claim 6, in which the feeding members are normally in engagement with the belts and adapted to be carried along by the forward movement of the belts and to be disengaged automatically from the belts, after the feeding operation has been accomplished.

8. An advertising apparatus as claimed in claim 6, in which each feeding member consists of a plate spring which is normally jammed between the belt and the corresponding belt pulley so as to be carried along by the movement of the belt, and which is provided with a friction device adapted to engage the outermost leaf of the packet.

9. An advertising apparatus comprising in combination a packet of advertising leaves, a rotatable friction shifting roller disposed along one edge of the packet and adapted to shift the leaves from one side of the packet to the other, a number of belt pulleys arranged at the opposite edge of the packet, a number of endless belts adapted to run round the packet over said shifting roller and said belt pulleys, a number of feeding members to be operated by the belts each consisting of a plate spring normally jammed between the corresponding belt and belt pulley so as to be carried along by the belt and carrying an elastic friction member adapted to engage the outermost leaf of the packet for moving the leaves successively into frictional engagement between the belts and the shifting roller, and means for guiding said feeding members along the belts.

10. An advertising apparatus as claimed in claim 9, in which each of the friction members consists of a flexible arm extending upwardly and provided at its outer end with a piece of rubber arranged to bear against the outermost leaf of the packet.

11. An advertising apparatus as claimed in claim 9, in which each of the friction members consists of a plate spring extending upwardly and slightly bulged turning the concave side against the leaves so as to cause the arm to be further bulged when operating.

12. An advertising apparatus comprising in combination a packet of advertising leaves, a friction roller shifting mechanism consisting of a friction roller disposed along one edge of the packet and a number of endless belts arranged to run round the packet and said roller and adapted to shift the leaves from one side of the packet to the other while turning the leaves round the roller, a friction feeding mechanism comprising a number of friction feeding members arranged to be actuated one by each belt and to operate against one side of the packet so as to advance the leaves successively into engagement between the shifting roller and the belts, means for imparting a feeding movement to the belts, means for imparting a return movement to the belts immediately following each feeding movement, and means for causing the feeding members to be restored to normal position by the return movement of the belts.

13. An advertising apparatus as claimed in claim 12, in which the feeding members are restored by a restoring device adapted to store up a certain amount of energy upon the operation of the shifting mechanism and to give it back after the shifting operation has been accomplished.

14. An advertising apparatus comprising in combination a packet of advertising leaves, a friction roller shifting mechanism consisting of a friction roller disposed along one edge of the packet and a number of endless belts arranged to run round the packet and said roller and adapted to shift the leaves from one side of the packet to the other while turning the leaves round the roller, a friction feeding mechanism comprising a number of friction feeding members arranged to be actuated one by each belt and to operate against one side of the packet so as to advance the leaves successively into engagement between the shifting roller and the belts, an intermittently operating driving device, a disengaging coupling connecting said driving device with the shifting mechanism so as to allow the shifting mechanism to continue its forward movement owing to its inertia, after the driving impulse has ceased, and a spring adapted to take up the kinetic energy of the shifting mechanism upon the operation thereof and to give it back after the shifting operation has been accomplished thereby causing the feeding members to be restored to normal position.

15. An advertising apparatus comprising in combination a packet of advertising leaves, a friction roller shifting mechanism consisting of a friction roller disposed along one edge of the packet and a number of endless belts arranged to run round the packet and said roller and adapted to shift the leaves from one side of the packet to the other while turning the leaves round the roller, means for feeding the leaves successively into frictional engagement between the roller and the belts, and longitudinal shoulders on said friction roller formed by recesses in the surface of the roller and adapted to engage the rear edge of the leaves after the leaf has been disengaged from the shifting mechanism, so as to push the leaves further into the packet.

16. An advertising apparatus as claimed in claim 15, in which the shoulders extend only over part of the length of the roller leaving the ends of the roller free.

17. An advertising apparatus comprising in combination a packet of advertising leaves, a friction roller shifting mechanism consisting of a friction roller disposed along one edge of the packet and a number of endless belts arranged to run round the packet and said roller and adapted to shift the leaves from one side of the packet to the other while turning the leaves round the roller, means for feeding the leaves successively into frictional engagement between the roller and the belts, and stop plates arranged so as to form a narrow slot through which the leaves have to pass when being shifted and which is so adapted with respect to the thickness of the leaves that only one leaf can be passed therethrough at a time.

18. An advertising apparatus comprising in combination a packet of advertising leaves, a friction roller shifting mechanism consisting of a friction roller disposed along one edge of the packet and a number of endless belts arranged to run round the packet and said roller and adapted to shift the leaves from one side of the packet to the other while turning the leaves round the roller, means for feeding the leaves successively into frictional engagement between the roller and the belts, and a container for the packet of advertising leaves the side walls of which form guides for the leaves, the rear part of said side walls converging in the direction of the transverse movement of the leaves within the container, whereas the foremost parts of the side walls are arranged parallelly with one another at a distance corresponding to the width of the leaves.

19. In an advertising apparatus having interchangeable advertising leaves, a pneumatic operating mechanism comprising a continuously operating air pump, a pneumatic driving device, a conduit connecting said air pump with said driving device and a control valve inserted in said conduit between the air pump and the driving device and means causing the control valve to open at a certain pressure at the inlet side of the valve, and means causing the control valve to be closed again at a pressure lower than the opening pressure so as to permit a predetermined quantity of compressed air to pass suddenly through the control valve to the driving device, a periodical operation being thereby established.

20. A pneumatic operating mechanism as claimed in claim 19, in which the surface of the movable member of the valve acted upon by the compressed air in the closed position is smaller than the surface of said member acted upon by the entering air in the opened position.

21. A pneumatic operating mechanism as claimed in claim 19, in which the driving device comprises a number of pistons movable in cylinders which are arranged to fit closely to the frame surounding the display surface of the apparatus.

22. In an advertising apparatus having interchangeable advertising leaves a pneumatic operating mechanism comprising a continuously operating air pump, a pneumatic driving device, a conduit connecting said air pump with said driving device and a control valve inserted between the air pump and the driving device, means causing the control valve to open at a certain pressure at the inlet side of the valve, and means causing the control valve to be closed again at a pressure lower than the opening pressure so as to permit a predetermined quantity of compressed air to pass suddenly through the control valve to the driving device, said driving device comprising a number of spring actuated pistons connected with the shifting mechanism of the apparatus by means of a ratchet device arranged so as to allow the pistons to return to their initial positions by the action of the spring power, a periodical operation being thereby established.

In testimony whereof I affix my signature.

KARL GUSTAF ÖSTBERG.